United States Patent [19]

Rhoades et al.

[11] 4,372,386
[45] Feb. 8, 1983

[54] STEAM INJECTION METHOD AND APPARATUS FOR RECOVERY OF OIL

[76] Inventors: Craig A. Rhoades, 9025 Wilshire Blvd., No. 215, Beverly Hills, Calif. 90211; Thomas Meeks, 3656 Virginia Ave., Lynwood, Calif. 90262

[21] Appl. No.: 236,447

[22] Filed: Feb. 20, 1981

[51] Int. Cl.³ ................ E21B 43/24; E21B 36/00
[52] U.S. Cl. .................................. 166/300; 165/45; 166/57; 166/302; 166/303
[58] Field of Search ............... 166/57, 59, 300, 302, 166/303, 272; 60/641.2, 641.3, 641.8; 165/45

[56] References Cited

U.S. PATENT DOCUMENTS

| | | | |
|---|---|---|---|
| 3,746,088 | 7/1973 | Haskin et al. | 166/59 |
| 3,845,627 | 11/1974 | Hutchinson | 60/641.3 |
| 3,871,455 | 3/1975 | Hardy et al. | 166/288 |
| 3,930,539 | 1/1976 | Curtis | 166/300 |
| 3,972,183 | 8/1976 | Chubb | 60/641 |
| 4,024,912 | 5/1977 | Hamrick et al. | 166/57 |
| 4,037,579 | 7/1977 | Chubb | 126/400 |
| 4,199,024 | 4/1980 | Rose et al. | 166/59 |
| 4,237,973 | 12/1980 | Todd | 166/59 |
| 4,243,098 | 1/1981 | Meeks et al. | 166/59 |

OTHER PUBLICATIONS

Talbot A. Chubb—"Characteristics of $CO_2$—$CH_4$ Reforming-Methanation Cycle Relevant to the Solchem Thermochemical Power System".
T. A. Chubb—"Analysis of Gas Dissociation Solar Thermal Power System".
T. A. Chubb et al.—"Application of Chemical Engineering to Large Scale Solar Energy".

Primary Examiner—Stephen J. Novosad
Assistant Examiner—George A. Suchfield
Attorney, Agent, or Firm—Fulwider, Patton, Rieber, Lee & Utecht

[57] ABSTRACT

A method and apparatus for recovering oil from an oil bearing formation utilizing steam injected into the formation. A working fluid is heated at the surface to produce a reversible, chemical reaction, particularly a reforming reaction in a reforming/methanation reaction cycle. The products of the reforming reaction are transported at near ambient temperatures to a downhole heat exchanger through which water is circulated. There a catalyst triggers the methanation reaction, liberating heat energy to convert the water to steam. The products of the methanation reaction are recirculated to the surface to repeat the cycle. In one embodiment the products of the methanation reaction are injected into the formation along with the steam. Various catalysts, and various systems for heating the working fluid are disclosed.

15 Claims, 10 Drawing Figures

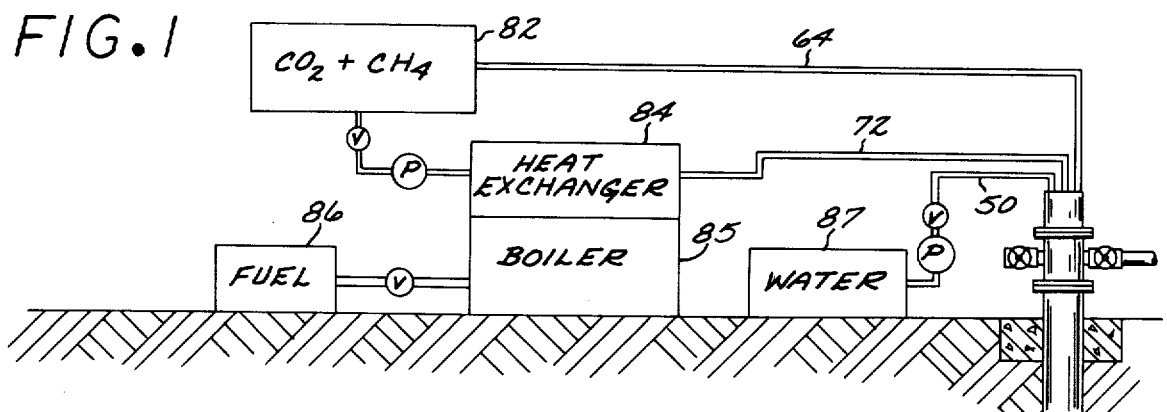
FIG.1
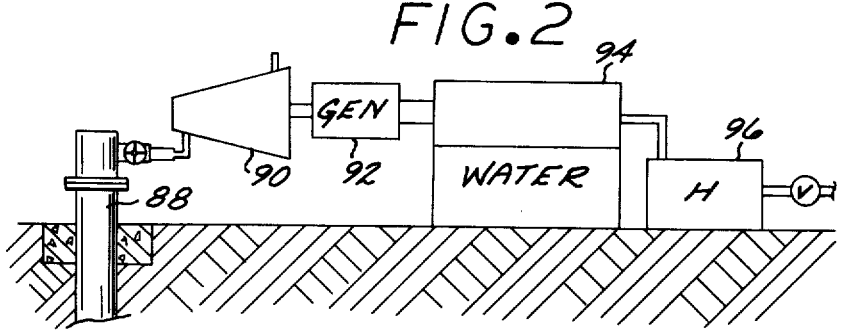
FIG.2
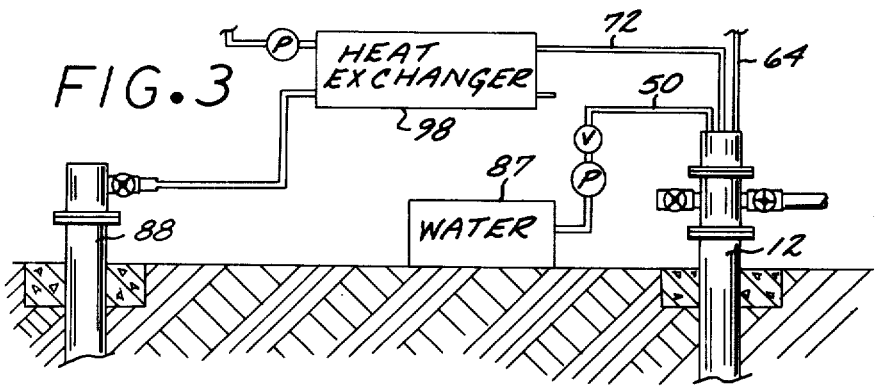
FIG.3
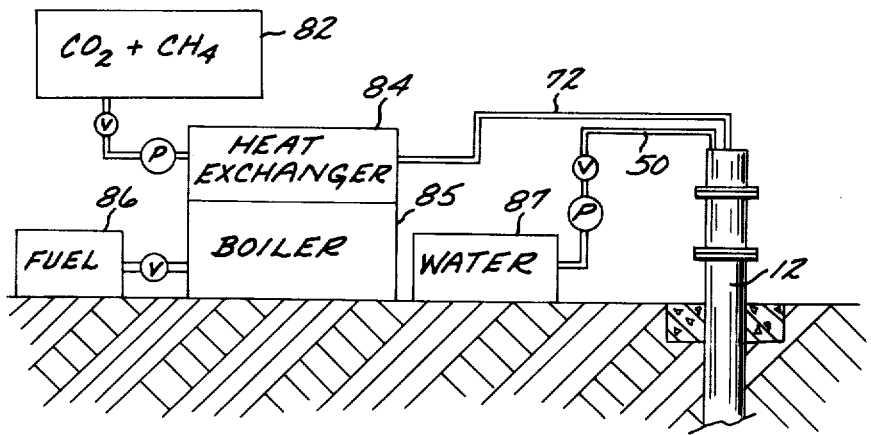
FIG.4
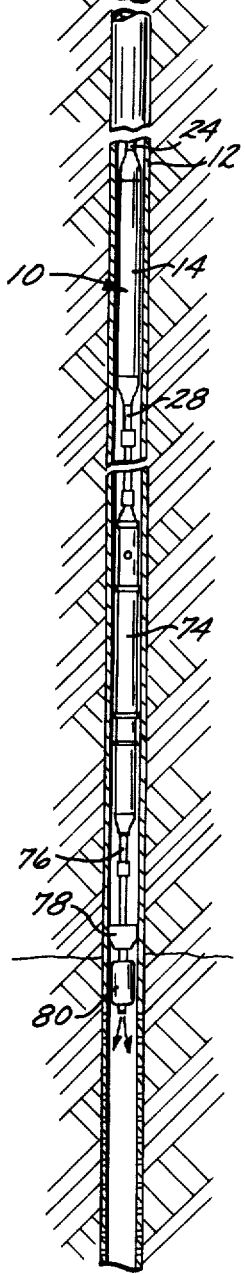

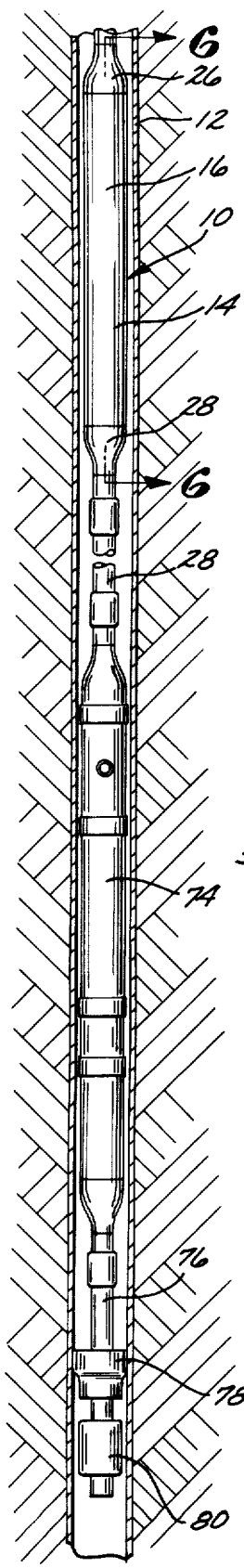

STEAM INJECTION METHOD AND APPARATUS FOR RECOVERY OF OIL

BACKGROUND OF THE INVENTION

1. Field of the Invention

The present invention relates to a method and apparatus for recovering oil from an oil bearing formation through injection of steam generated in situ.

2. Description of the Prior Art

Initial production from an oil well utilizes the pressure of gases in the oil formation. This is followed by pumping when the gas pressure diminishes. Eventually, even pumping is inadequate to produce acceptable quantities of oil and resort must be had to secondary recovery methods. These include thermal stimulation of the well by raising the temperature of the oil formation to lower the oil viscosity and enhance its flow.

Various types of thermal stimulation have been utilized, including electric or hot water heaters, gas burners, in-situ combustion, hot water or steam injection, and miscible phase displacement fluid such as carbon dioxide. Of these, steam injection has many advantages.

Present systems for injecting steam in deep wells have certain disadvantages. In most such systems the steam is generated at the surface and piped down through the well casing to the base of the borehole. In a deep well a considerable amount of heat is lost through the casing, and the temperature and quality of the steam is generally inadequate to effectively thermally stimulate formations at the base of the borehole.

Prior art attempts to generate steam in-situ or downhole have been ineffective since combustion requires that the fuel and air be provided at the pressure of the steam discharged from the combustor. The size and complexity of air compressors required to provide such high pressure become economically prohibitive.

An effective system of generating steam of high quality and temperature in situ is disclosed in our U.S. Pat. No. 4,243,098, issued Jan. 6, 1981, and entitled "DOWNHOLE STEAM APPARATUS". That apparatus employs a housing for location in the borehole and including a combustor for mixing and buring fuel and air, and a heat exchanger for converting circulated water into steam, the steam being injected into the borehole and the spent gases passing upwardly through the borehole to the surface. The system avoids use of high pressure air compressors, but the venting of the spent gases to the atmosphere is a source of environmental pollution which is unacceptable in certain geographical areas.

Since flooding of the oil formation with steam has been found to significantly lower the flow resistance of the oil in the vicinity of the borehole, thereby enabling extraction of the displaced oil from adjacent recovery wells, it is desirable to provide a means for in situ steam generation without attendant environmental pollution and without significant loss of heat other than in the production of steam.

SUMMARY OF THE INVENTION

According to the present invention, heat energy is made available downhole for steam generation by use of a working fluid to thermochemically carry the energy from the surface. The working fluid is of that class characterized by a reversible, catalytically-controllable reaction.

An endothermic reaction of the working fluid components is achieved at the surface by addition of heat energy through any suitable means. The products of the endothermic reaction are then transported at near ambient temperatures to a downhole heat exchanger through which water is circulated. A catalytic material in the heat exchanger triggers an exothermic reaction of the working fluid components, releasing heat energy sufficient to convert the circulated water into steam for injection into the formation.

In a preferred method, the endothermic reaction is a reforming reaction of carbon dioxide and methane to form carbon monoxide and hydrogen. The exothermic reaction which takes place in the heat exchanger is a methanation reaction of the carbon monoxide and hydrogen to form carbon dioxide and methane for recirculation to the surface to repeat the cycle.

With the foregoing arrangement there is little heat loss in conveying the working fluid downhole, or in recirculating it to the surface. There are no products of combustion which must be vented up the borehole, and the working fluid can be continually recycled without significant loss. High pumping pressures are unnecessary in the transportation of water and working fluid to the downhole steam injection area.

Heat energy to initiate the endothermic reaction at the surface may be provided by conventional boilers, by extraction of such energy from geothermal wells, or by other conveniently available heat sources characterized by little or no environmental pollution.

Other objects and features of the invention will become apparent from consideration of the following description taken in connection with the accompanying drawings.

BRIEF DESCRIPTION OF THE DRAWINGS

FIG. 1 is a side elevational view of portions of the present apparatus located in a well, the remaining portions of the apparatus being illustrated diagrammatically;

FIG. 2 is a diagrammatic representation of a geothermal heating system;

FIG. 3 is a diagrammatic representation of another form of geothermal heating system;

FIG. 4 is a diagrammatic representation of reforming-methanation apparatus in which the products of the methanation reaction are not recirculated;

FIG. 5 is an enlarged side elevational view of the portions of the apparatus normally located in the well;

FIG. 6 is an enlarged view taken along the line 6—6 of FIG. 5;

FIG. 7 is a view taken along the line 7—7 of FIG. 6;

FIG. 8 is a view taken along the line 8—8 of FIG. 6;

FIG. 9 is a view taken along the line 9—9 of FIG. 6; and

FIG. 10 is a view taken along the line 10—10 of FIG. 6.

DESCRIPTION OF THE PREFERRED EMBODIMENTS

Referring to the drawings, there is illustrated an apparatus 10 for recovering oil from an oil bearing formation penetrated by a well borehole within which is located a tubular casing 12. Typically, the well is a production well whose production has become so diminished that it is no longer economically operable. This may be caused by a number of factors, such as a natural depletion of the reservoir, or a plugging or clogging of the formation adjacent the well borehole by waxes, paraffins or other material.

The present method can be used with such a well functioning as an injection well or as both an injection and a production well. In the latter case, the apparatus 10 generates steam which is injected into the adjacent formation for a predetermined period of time. On shut down oil flows back to the well, where it is recovered. Where the well is located in a field with adjacent production wells, the well serves as an injection well, and the injected steam drives oil through the formation to the adjacent production wells for collection.

As will be seen, the apparatus 10 includes a heat exchanger at the base of the borehole for converting water into steam for injection. It utilizes heat energy provided by a thermochemical energy transport system. Thus, instead of carrying steam from the surface for injection, or pumping fuel and air to a downhole combustor, the apparatus 10 utilizes a working fluid which has a latent energy which is liberated downhole to provide the necessary heat energy to generate steam.

The working fluid is selected from that class of fluids which are adapted to undergo an endothermic reaction when heated, with the products of the reaction being capable of transportation at near ambient temperatures to a remote location where an exothermic reaction can be catalytically induced to release desired heat energy. The products of the latter reaction are recirculated in a closed cycle operation.

Various working fluids can be employed in practicing the present invention. For example, in solar energy applications $SO_3$ has been converted in $SO_2+O_2$ in a dissociation reactor chamber by addition of solar heat energy. The solar energy is now in the form of what might be termed thermochemical energy. This can be released in a reversible gas phase chemical reaction which takes place in a recombination reaction chamber, producing $SO_3$ for recirculation. Such a working fluid could be used in conjunction with the present method and apparatus as well.

Another system of the prior art employs the dissociation and resynthesis of ammonia, which is also a potential working fluid for the present system.

The preferred working fluid for use with the present invention is a carbon dioxide reforming/methanation cycle. In this system carbon dioxide and methane undergo a reforming reaction at temperatures above approximately 700° C., producing carbon dioxide and hydrogen. This can be transported downhole at near ambient temperatures of between 20° C. and 60° C. with insignificant heat losses. The energy required to transport such a working fluid is much less than that required, for example, to transport fuel and compressed air to a downhole combustor.

On reaching the base of the borehole the carbon dioxide and hydrogen undergo a catalytically promoted methanation reaction in combination catalytic converter and heat exchanger, producing carbon dioxide and methane which can be recirculated to the surface to repeat the cycle. The heat liberated during methanation develops a temperature of approximately 900° C., which is utilized in the heat exchanger to convert water to steam for injection into the formation.

Since carbon dioxide mixed with methane has been found to be useful as an injectable miscible phase displacement fluid for oil recovery, the carbon dioxide and methane could be injected into the formation along with the steam. However, the loss of working fluid to the formation would increase oil recovery costs and the increased costs would have to be justified by the enhanced oil recovery.

Various methods can be employed to provide the necessary heat to produce the reforming reaction at the surface, the most straightforward being a fuel fired boiler. In addition, various methanation catalysts can be employed, such as tungsten and other known catalysts, but nickel has been found to be most effective in promoting methane formation with a minimum of undesired carbon deposition on the nickel catalyst surfaces.

With particular reference to FIGS. 1 and 5 through 10, the apparatus 10 is operatively disposed within the usual well casing 12 of the well borehole. The combination catalytic converter and heat exchanger 14 is made of suitable corrosion resistant material and is approximately 36 feet long in one embodiment. It includes a cylindrical central portion 16, an upper header 18 welded to the upper end of the central portion 16, and a lower header 22 welded to the lower end of the central portion 16.

The heat exchanger 14 is suspended within the casing 12 by a pipe 24 welded to an upper transition portion 26 which is welded to the upper header 18. A similar pipe 28 is welded to a lower transition portion 30 which, in turn, is welded to the lower header 22, the pipe 28 serving to connect other portions of the apparatus 10 to the heat exchanger 14, as will be seen.

An annular cylindrical water circulation space 32 is defined adjacent the outer wall of the heat exchanger 14 by a cylindrical jacket wall 34 welded at its upper and lower extremeties to the upper and lower headers 18 and 22, respectively.

An annular working fluid space 36 is defined adjacent the jacket wall 34 by a cylindrical catalyst wall 38 attached at its upper extremity to a circular inner header 40 and at its lower extremity to the lower header 22. The surfaces defining the space 36, including the adjacent surfaces of the catalyst wall 38 and the jacket wall 34 are coated with a suitable nickel catalyst material for inducing the methanation reaction. If desired, the full thicknesses of these walls could be made of nickel.

Six heat exchanger tubes 42 are circumferentially arranged within the heat release space or methanation chamber 44 which is defined within the cylindrical catalyst wall 38. The tubes 42 are preferably made of nickel, or are coated with nickel catalyst material for catalytically inducing the methanation reaction.

The upper extremities of the tubes 42 are disposed through suitable openings provided in an upper circular plate or tube support 46 secured by any suitable means to the underside of the inner header 40. The lower extremities of the tubes 42 are similarly disposed through suitable openings in a circular plate or lower tube support 48 attached to the upper face of the lower header 22.

Water is carried to the heat exchanger 14 by means of a pipe 50 which extends upwardly through the pipe 24. The lower end of the pipe 50 is threaded within a suitable opening in the upper header 18 in communication with a header passage 52 which communicates with the water circulation space 32. The water is forced into a circuitous, helical path toward the bottom of the water circulation space 32 by means of a helical element 54 located in the space 32.

At the base of the space 32 the water passes through a circular header passage 56 formed in the lower header 22 and having vertical legs in communication with the lower ends of alternate ones of the tubes 42. Water flows upwardly through the tubes 42, out of the upper ends of the tubes into three header passages 58 in the inner header 40, and into the upper ends of the remaining three tubes 42. Water passes from the lower end of the tubes 42 through three vertical header passages 60 in a lower header 22 for discharge through three downwardly directed nozzles 62 located in the lower transition portion 30, as best seen in FIG. 10.

During passage through the tubes 42 the water is raised in temperature to approximately 900° C. by heat generated within the methanation chamber 44, by the methanation reaction of the working fluid, the generated steam being discharged into the lower transition portion 30.

At the surface the working fluid components are carbon monoxide and hydrogen. These are carried downwardly through a pipe 72 which extends through the pipe 24 and through a suitable opening in the upper header 18. The lower end of pipe 72 opens to a hemispherical space 70 formed within the upper header 18. From there the working fluid enters the working fluid space 36, sweeping across the relatively large surface areas of catalytic material in that space and immediately undergoing the methanation reaction. The heat thereby liberated passes into the wall 34 to preheat water flowing through the water circulation space 32, and also passes into the wall 38 for raising the temperature in the methanation chamber 44.

The working fluid next enters the bottom of the methanation chamber 44 through a header passage 68 provided in the lower header 22, and through a central opening 66 in the lower tube support 48. The working fluid circulates upwardly, swirling about the exterior surfaces of the tubes 42 and across the interior surfaces of the catalyst wall 38. If desired, all surfaces defining a path for the working fluid in the heat exchanger 14 can be coated with catalyst material to promote the desired methanation reaction.

The working fluid, now almost completely carbon monoxide and methane, leaves the methanation chamber 44 through a discharge pipe 64 which carries the working fluid components back to the surface through the pipe 24.

The discharged steam from the heat exchanger 14 is carried by the pipe 28 to a usual steam expansion chamber 74, as seen in FIGS. 1 and 5, associated with commercially known devices for determining the temperature and pressure of the steam. Such devices do not form a part of the present invention and are therefore not described in detail. The temperature and pressure signals generated by such devices are carried to the surface by suitable electrical conduits (not shown) for use in controlling, for example, water pressure, proportion of carbon dioxide and methane, and the temperature of the surface reforming reaction, and thereby achieving optimum steam quality.

The assembly containing the expansion chamber 74 and associated pressure and temperature sensing devices is connected by a pipe 76 to a suitable packer 76 which in turn is connected to a one-way valve 80. The packer 76 is operative to expand against the casing 12 and provide a fluid tight seal for preventing discharged steam from escaping upwardly through the borehole. Suitable packers well known to those skilled in the art include a fluid expansible type, a thermally responsive type, a type adapted to seat by an upward pulling upon the drill string, or a type which seats upon twisting of the drill string. The latter is the type diagrammatically indicated.

The one-way valve 80 is also well known and therefore not described in detail. It is designed to prevent excessive downhole pressures from forcing foreign matter back into the apparatus 10.

Carbon and other materials may collect upon the surfaces defining the path for the working fluid as it undergoes the methanation reaction and adversely affect desired heat transfer and catalytic action. In that event water flow through the heat exchanger 14 is reduced, the amount of the reduction being adjusted to increase the temperature in the methanation chamber 44 sufficiently to facilitate sloughing off of the unwanted deposits from the catalytic surfaces. Next, the flow of working fluid to the heat exchanger 14 is shut off and instead a suitable solvent or other cleaning agent is passed through the pipe 72 to the working fluid passages of the heat exchanger 14. The deposits flushed away are preferably carried back to the surface through the pipe 64 for suitable disposal. This procedure provides downhole cleaning with a minimum shut down period.

Referring now to FIGS. 1 through 4, various means are diagrammatically illustrated to provide the heat necessary to induce the reforming reaction of the carbon dioxide and methane. In the embodiment illustrated in FIG. 1, a working fluid reservoir 82 discharges into suitable conduits forming a part of a surface heat exchanger 84, suitable valving and pressure indicating devices being employed in this regard. A typical boiler 85 drawing fuel through a fuel supply 86 heats the carbon dioxide and methane passing through the heat exchanger 84 sufficiently to induce the desired reforming reaction. The resulting carbon dioxide and hydrogen then pass downhole to the heat exchanger 14 through the pipe 72.

If desired, an additional heat exchanger (not shown) may be employed at the surface to extract heat from the working fluid discharged from the surface heat exchanger 84 before the fluid proceeds downhole. This will preheat the working fluid entering the reservoir 82 through the tube 71.

Water is supplied to the heat exchanger 14 from any suitable water reservoir 87 under the impetus of usual pumps (not shown).

In the heating system illustrated in FIG. 2, heated gases and steam from a geothermal wall 88 pass to a steam turbine 90 for operating an electrical generator 92. The generator 92 is connected to apparatus 94 known to those skilled in the art for converting water into hydrogen and oxygen without significant environmental pollution. The generated hydrogen passes into a collector 96 and serves as fuel for operating a boiler such as the boiler 85 of the system of FIG. 1.

In the system of FIG. 3, the heated gases and steam derived from the geothermal well 88 are themselves utilized in a heat exchanger 98 to provide the heat of reaction necessary to induce the reformation reaction of the carbon dioxide and methane.

FIG. 4 is illustrative of an open cycle reforming/methanation system in which the carbon dioxide and methane developed in the methanation reaction in the downhole catalytic converter-heat exchanger 14 are not recycled to the reservoir 82, but are instead discharged into the formation along with the steam generated by the heat exchanger 14. For this purpose the discharge pipe 64 would be closed and a discharge tube 100 opening out of the bottom of the methanation chamber 44, as seen in FIG. 10, would be employed to carry the reaction products away for injection into the adjacent formation along with the steam.

The foregoing method and apparatus are adapted to provide in situ steam injection without any necessity for downhole combustion, instead utilizing an environmentally acceptable and energy efficient thermochemical transport of energy by a working fluid adapted to undergo a reversible reaction.

Various modifications and changes may be made with regard to the foregoing detailed description without departing from the spirit of the invention.

We claim:

1. A method for generating heat to produce steam for injection into an oil bearing formation penetrated by a borehole, said method comprising:
   selecting a working fluid from that class of fluids having first components adapted to undergo an endothermic first reaction upon subjection to reaction heat energy to form second components, wherein said second components are adapted to undergo a reverse, exothermic second reaction to form said first components and release substantially all of said reaction heat energy;
   applying said reaction heat energy to said first components to form said second components;
   conveying said second components down said borehole and inducing said second reaction to release substantially all of said reaction heat energy and form said first components;
   conveying water down said borehole into heat exchange relation to said first components to cool said first components and utilize said reaction heat energy to convert said water to steam; and,
   injecting said steam into said formation.

2. A method according to claim 1 wherein said first components and said steam in said borehole are constrained against intermixture, and said first components are conveyed out of said borehole for reuse in said method.

3. A method according to claim 1 wherein said first components are circulated in heat exchange relation to steam from a geothermal well thereby to derive said reaction heat energy to induce said first reaction.

4. A method according to claim 1 wherein said first reaction is a reforming reaction of first components comprising carbon dioxide and methane to form said second components comprising carbon monoxide and hydrogen, and said second reaction is a methanation reaction of said second components to form said first components.

5. A method according to claim 4 wherein said first components formed by said methanation reaction are injected into said formation with said steam.

6. A method according to claim 4 wherein a nickel catalyst is employed to induce said second reaction.

7. Apparatus for generating heat to produce steam for injection into an oil bearing formation penetrated by a borehole, said apparatus comprising:
   container means;
   a working fluid in said container means, said working fluid comprising first components adapted to undergo an endothermic first reaction upon subjection to reaction heat energy to form second components, said second components being adapted to undergo a reverse, exothermic second reaction upon subjection to catalytic means to form said first components and release said reaction heat energy;
   first heat exchanger means for supplying said reaction heat energy to said first components to form said second components;
   second heat exchanger means for location in said borehole and including a first portion having catalytic means, an inlet for receiving said second components, and outlet means for discharging said first components subsequent said exothermic second reaction, said second heat exchanger means further including a second portion having an inlet for receiving water and an outlet for discharging steam into said borehole, said second portion being located in heat exchange relation to said first portion for conversion of said water to steam by said reaction heat energy;
   first conduit means connected to said first heat exchanger means and to said inlet of said first portion of said second heat exchanger means for conveying said second components to said second heat exchanger;
   water supply means; and
   second conduit means connected to said water supply means and to said inlet of said second portion of said second heat exchanger means.

8. Apparatus according to claim 7 and including third conduit means connected to said outlet of said second heat exchanger and to said container means for conveying the formed said first components back to said container means.

9. Apparatus according to claim 7 wherein said outlet of said first portion of said second heat exchanger means is arranged to discharge into said borehole with said steam.

10. Apparatus according to claim 7 wherein said first heat exchanger means includes a fuel burning boiler.

11. Apparatus according to claim 10 wherein said boiler is coupled to a hydrogen generating means.

12. Apparatus according to claim 7 wherein said first heat exchanger means includes means for coupling said first heat exchanger means to a geothermal well for deriving said reaction heat energy.

13. Apparatus for generating heat to produce steam for injection into an oil bearing formation penetrated by a borehole, said apparatus comprising:
   methanation reaction means slidably insertable within said borehole and including a reactor portion having a methanation catalyst for catalytically promoting a methanation reaction of carbon monoxide and hydrogen to form carbon dioxide and methane, accompanied by the release of reaction heat energy, and further including a heat exchanger portion adapted to receive water and directly exposed to said reaction heat energy for conversion of said water into steam by said reaction heat energy including means for discharging said steam into said borehole, said means for discharging said steam being coupled to said heat exchanger portion;
   reforming reactor means for surface location, and adapted to heat carbon dioxide and methane to reform carbon monoxide and hydrogen;
   supply means for conveying carbon dioxide and methane to said reforming reaction means; and
   water supply means coupled to said heat exchanger portion.

14. Apparatus according to claim 13 and including conduit means for conveying carbon dioxide and methane from said methanation reactor portion to said supply means.

15. Apparatus according to claim 13 wherein said heat exchanger portion includes means defining multiple pass paths for said water to flow adjacent said reactor portion.

* * * * *